United States Patent [19]

Vosnick

[11] 4,261,407

[45] Apr. 14, 1981

[54] COMPOSITION FOR TREATMENT OF RACING TIRES AND THE TREATED TIRES

[76] Inventor: Thomas F. Vosnick, 1944 Homestead-Duquesne Rd., West Mifflin, Pa. 15122

[21] Appl. No.: 131,411

[22] Filed: Mar. 14, 1980

[51] Int. Cl.$^3$ .......................... B60C 1/00; C08L 7/00; C08L 17/00

[52] U.S. Cl. ...................................... 152/374; 106/34; 260/32.2; 260/759; 428/492; 428/493; 428/519

[58] Field of Search ................... 152/208, 209 R, 374, 152/167, 211; 106/36, 311; 428/492, 493, 519; 260/759, 32.2, 32.8 A, 33.6 A, 719, 730

[56] References Cited

U.S. PATENT DOCUMENTS

| | | | |
|---|---|---|---|
| 1,968,004 | 7/1934 | Ulmer | 106/36 X |
| 2,537,982 | 1/1951 | Finn | 156/110 A UX |
| 2,585,219 | 2/1952 | Boyle | 152/211 |
| 2,771,458 | 11/1956 | Van Gilder et al. | 260/759 X |
| 2,921,918 | 1/1960 | Mooney et al. | 106/36 X |
| 2,992,200 | 7/1961 | Maly | 260/28 X |
| 3,062,696 | 11/1962 | Riehl | 152/209 R X |
| 3,245,821 | 4/1966 | Skinner | 106/311 |
| 3,271,170 | 9/1966 | Ahlberg et al. | 106/36 |
| 3,399,706 | 9/1968 | Prusha | 152/211 |

*Primary Examiner*—John T. Goolkasian
*Assistant Examiner*—Thomas Bokan
*Attorney, Agent, or Firm*—Harvey B. Jacobson

[57] ABSTRACT

A racing tire coated with a composition that contains rubber extracted from used tires dispersed in a combination solvent has increased traction, pliability and service length over untreated racing tires. The extracted rubber can be natural rubber, synthetic rubber, or a mixture thereof, while the solvent includes a major amount of a mixed hydrocarbon petroleum distillate, and minor amounts of dimethyl ketone and methyl salicylate.

10 Claims, No Drawings

COMPOSITION FOR TREATMENT OF RACING TIRES AND THE TREATED TIRES

BACKGROUND OF THE INVENTION

1. Field of the Invention

The present invention relates to a composition of an elastomeric or rubber material dispersed in a solvent therefor for use in treating racing tires, commonly known as slicks, to provide increased traction, pliability and length of service of the treated tire.

2. Disclosure Statement

Rubber based coating compositions for the treatment of tires are known for increasing the strength of the tire, such as disclosed in U.S. Pat. No. 3,062,696, issued Nov. 6, 1962, to Riehl, in which a rubbery polymer in a solvent is used for treating unvulcanized treads as well as vulcanized tires for improving the resistance of the treated tire to groove cracking. A skid-resistant rubbery composition for treating rubber tires is disclosed in U.S. Pat. No. 2,585,219, issued Feb. 12, 1952, to Boyle, in which a rubbery polymer and a mixture of crushed nut shell particles and oat hulls are formed generally by an extrusion process into a tread contour in which an assembled tire including the formed tread is then vulcanized. A method of dissolving or dispersing a high molecular weight elastomeric polymer in a desired solvent or suspending medium is disclosed in U.S. Pat. No. 2,992,200, issued July 11, 1961, to Maly, in which the elastomeric polymer or rubberoid material is treated with a series of swelling agents and solvent agents. A self-toughening adhesive or coating composition is disclosed in U.S. Pat. No. 2,537,982, issued Jan. 16, 1951, to Finn, comprising a rubbery polymer dissolved in a mixed solvent into which salicylic acid is added. The cement composition can be applied to both metal and fabric. None of the patents cited above discloses the coating composition of the present invention for the treatment of racing tires.

SUMMARY OF THE INVENTION

In accordance with the present invention, racing tires or slicks are coated with an elastomeric or rubber material dispersed in a combination solvent. The rubber material can be a natural rubber, a synthetic rubber, or a mixture thereof, the particular rubber not being critical. The rubber material is preferably extracted from used and worn out tires by the combination solvent of the present invention and then added in the required amounts to the specific combination solvent formulation. The combination solvent is a mixture comprising a major amount of a mixed hydrocarbon petroleum distillate and minor amounts of dimethyl ketone and methyl salicylate. The composition containing the rubber dispersed in the combined solvent increases the traction, pliability and length of service of racing tires so treated.

Accordingly, it is an object of the present invention to increase the traction of racing tires.

It is a further object of the invention to provide a composition which when applied to racing tires will increase the traction, pliability and length of service of the tire so treated.

It is still another object of the invention to provide a composition comprising an elastomeric or rubber material dispersed in a combination solvent which when applied to racing tires will increase traction, pliability and length of service.

It is still yet another object of the invention to provide a composition comprising a rubber extracted from old and worn out tires which is added to a combination solvent for the treatment of racing tires.

These together with other objects and advantages which will become subsequently apparent reside in the details of the composition and use as more fully hereinafter described and claimed.

DETAILED DESCRIPTION OF THE INVENTION

The elastomeric material or rubber used in the present invention is preferably one which has been extracted from old, used or worn out tires which are not longer usable. The specific rubber composition, therefore, is not critical and as such any natural rubber, synthetic rubber, or mixtures thereof used in the formation of conventional pneumatic tires or racing tires can be utilized. The rubber can be extracted from the used tires by the combination solvent of the present invention. Once extracted, the rubber can be added to the combination solvent formulated in accordance with the present invention as shown in Table I.

TABLE I

| Component | Range Amounts (Volume) |
|---|---|
| Methyl Salicylate | .195–1% |
| Dimethyl ketone | 2–4.5% |
| Extracted Tire Rubber | 2.5–5% |
| Petroleum distillate solvent | 90–95%. |

The tire rubber is preferably extracted by rubbing the surface of the used tire with a cloth containing the combination solvent. The rubber which is extracted from the tire onto the cloth can then be either scrapped or dissolved in the combination solvent formulation disclosed in Table I. Of course, natural rubber or synthetic rubber may be added directly, without extraction, though the extraction technique is simple and enables the composition to be easily prepared in the environment it is used, e.g., drag strips, race tracks.

Racing tires can be treated with the composition of the present invention by any of the conventional coating techniques such as brushing, spraying or dipping, although brushing or wiping the rubber composition appears to be the best technique of application. The coating composition is applied evenly to the surface contacting portions of the racing tire so that all such surfaces are wetted with a thin coat. The composition has been found to increase the traction, pliability and even length of service of the racing tire so treated. While not wishing to be bound by any theory, it is believed that the combination solvent dissolves or swells the rubber material contained therein and the surface rubber of the racing tire thereby producing a more tackified surface on the racing tire which increases the traction of the treated tires on the roadway or racing strip.

In Table II there is shown the preferred amounts of each material which can be used to form the traction aid composition of the present invention. The amounts shown are per gallon of total composition.

TABLE II

| Component | Amount (Volume) |
|---|---|
| Methyl Salcilate | ¼–1¼¼ oz. |
| Dimethyl Ketone | 3–5½ oz. |
| Extracted Tire Rubber | 3½–6 oz. |

TABLE II-continued

| Component | Amount (Volume) |
|---|---|
| Petroleum Distillate Solvent | 115¼–121¼ oz. |

The following Example discloses a preferred composition which in accordance with the teachings of the invention provides good traction and pliability of the treated racing tire and extends significantly the length of service of the tire.

EXAMPLE I

One gallon of the traction aid composition was formulated from the following components:
¼ oz. Methyl Salicylate
3 oz. Dimethyl Ketone
3½ oz. Extracted Tire Rubber
121¼ oz. Mixed Hydrocarbon Petroleum Distillate "Safety Kleen Solvent 105".

The above components were mixed until the rubber was uniformly distributed within the solvent and then wiped onto the contacting surface of a racing tire, so that all such surfaces were uniformly wetted with a thin coat of the composition.

The foregoing is considered as illustrative only of the principles of the invention. Further, it is not desired to limit the invention to the exact composition shown and described, or to be bound by any theory expressed, and accordingly, all suitable modifications and equivalents may be resorted to, falling within the scope of the invention.

What is claimed as new is as follows:

1. A coating composition for the treatment of racing tires to increase traction, pliability and length of service comprising a rubber selected from the group consisting of natural rubber, synthetic rubber, and mixtures thereof dispersed in a combination solvent including a major amount of a hydrocarbon petroleum distillate solvent and minor amounts of methyl salicylate and dimethyl ketone.

2. The composition of claim 1 wherein said rubber is added in the amounts of about 2.5% to 5% by volume of the total composition.

3. The composition of claim 2 wherein the combination solvent is added in the amounts of about 0.195% to 1% methyl salicylate, 2.5 to 4.5% dimethyl ketone and 90 to 95% hydrocarbon petroleum distillate solvent by volume based on the total volume of a composition.

4. The composition of claim 1 comprising ¼ oz. methyl salicylate, 3 oz. dimethyl ketone, 3½ oz. rubber, 121¼ oz. hydrocarbon petroleum distillate per gallon of composition.

5. The composition of claim 1 wherein said rubber is added to the composition by extraction of the rubber from formed rubber tires using a solvent comprising a major amount of mixed hydrocarbon petroleum distillate and minor amounts of methyl salicylate and dimethyl ketone.

6. A rubber tire used for automobile racing comprising a coating thereon of a rubber selected from the group consisting of natural rubber, synthetic rubber, and mixtures thereof, dispersed in a combination solvent including a major amount of a mixed hydrocarbon petroleum distillate and minor amounts of methyl salicylate and dimethyl ketone.

7. The racing tire of claim 1 wherein said coating is applied evenly to all the surface contacting portions of the tire.

8. The racing tire of claim 1 wherein said rubber material is extracted from conventional rubber tires.

9. The racing tire of claim 1 wherein said coating comprises about 2.5 to 5% rubber, 0.195 to 1% methyl salicylate, about 2.0 to 4.5% dimethyl ketone, and about 92 to 95% hydrocarbon petroleum distillate solvent, by volume.

10. The racing tire of claim 9 wherein said coating comprises per gallon 3½ oz. rubber, ¼ oz. methyl salicylate, 3 oz. dimethyl ketone, and 121¼ oz. of mixed hydrocarbon petroleum distillate.

* * * * *